United States Patent
Shuter

(10) Patent No.: US 11,324,212 B2
(45) Date of Patent: May 10, 2022

(54) HOT WATER STEAM COVER FOR PROTECTING PLANTS WHILE SPRAYING

(71) Applicant: SHUTER SOIL HEALTH SOLUTIONS LLC, Frankton, IN (US)

(72) Inventor: Michael A. Shuter, Frankton, IN (US)

(73) Assignee: Shuter Soil Health Solutions LLC, Frankton, IN (US)

( * ) Notice: Subject to any disclaimer, the term of this patent is extended or adjusted under 35 U.S.C. 154(b) by 246 days.

(21) Appl. No.: 16/559,781

(22) Filed: Sep. 4, 2019

(65) Prior Publication Data

US 2020/0068868 A1 Mar. 5, 2020

Related U.S. Application Data

(60) Provisional application No. 62/726,459, filed on Sep. 4, 2018.

(51) Int. Cl.
- *A01M 7/00* (2006.01)
- *B05B 12/34* (2018.01)
- *B05B 1/28* (2006.01)
- *B05B 12/36* (2018.01)

(52) U.S. Cl.
CPC ........ *A01M 7/0064* (2013.01); *A01M 7/0042* (2013.01); *B05B 1/28* (2013.01); *B05B 12/34* (2018.02); *B05B 12/36* (2018.02)

(58) Field of Classification Search
CPC .. B05B 1/24; B05B 1/28; B05B 9/002; B05B 12/34; B05B 12/36; A01M 7/0042; A01M 7/0064
See application file for complete search history.

(56) References Cited

U.S. PATENT DOCUMENTS

| | | | | |
|---|---|---|---|---|
| 5,139,200 A | * | 8/1992 | Greimann | B05B 12/36 239/288.3 |
| 5,366,154 A | * | 11/1994 | Thompson | A01M 21/043 239/13 |
| 6,047,900 A | * | 4/2000 | Newson | A01M 21/04 239/135 |
| 6,073,859 A | * | 6/2000 | Gorgens | A01M 21/04 239/128 |
| 6,116,519 A | * | 9/2000 | Williamson | A01M 7/0014 239/168 |
| 8,740,109 B2 | * | 6/2014 | Muston | A01M 21/04 239/13 |
| 9,578,868 B2 | | 2/2017 | Jones et al. | |
| 2017/0360022 A1 | * | 12/2017 | Clayton | A01M 7/0064 |

* cited by examiner

*Primary Examiner* — Ryan A Reis
(74) *Attorney, Agent, or Firm* — Zarley Law Firm, P.L.C.

(57) ABSTRACT

A system and method of protecting plants while spraying having a hood mounted to a farm implement and positioned between plant rows and below plant vegetation. Extending through the hood into a hollow chamber is a hydraulic fitting having a spray nozzle. Heated water is supplied to the hydraulic fitting.

11 Claims, 4 Drawing Sheets

HOT WATER STEAM COVER FOR PROTECTING PLANTS WHILE SPRAYING

CROSS REFERENCE TO RELATED APPLICATION

This application claims the benefit of U.S. Provisional Application No. 62/726,459 filed Sep. 4, 2018, the contents of this application is hereby incorporated by reference in its entirety.

BACKGROUND OF THE INVENTION

This invention is directed to a cover for protecting plants while spraying, and more particularly, a cover that enables the use of hot water to destroy weeds.

Spraying for weeds is well-known in the farming industry. While there are a number of ways to perform this task, typically, an agricultural sprayer having a chassis supported by a wheeled carriage, has a spray delivery system that sprays a field with chemicals such as fertilizer, herbicides, fungicides, and the like. While useful, as organic farming has become more popular, traditional methods do not meet environmental requirements and objectives. Accordingly, there exists a need in the art for a new way to weed a field organically.

An objective of the present invention is to provide a system and method of killing weeds while protecting plant vegetation.

A further objective of the present invention is to provide a system and method of utilizing heated water to kill weeds.

These and other objectives will be apparent to those having skill in the art based on the following written description, drawings and claims.

SUMMARY OF THE INVENTION

A system and method for protecting plants by spraying includes a cover or hood with an open bottom that forms a hollow chamber. The hood is positioned between plant rows and below plant vegetation.

Extending through the hood into the hollow chamber is a hydraulic fitting having a spray nozzle. A fluid conduit is coupled to the hydraulic fitting at one end and to a heater at the opposite end. A fluid tank is connected.

DETAILED DESCRIPTION OF THE PREFERRED EMBODIMENTS

Figure 1:
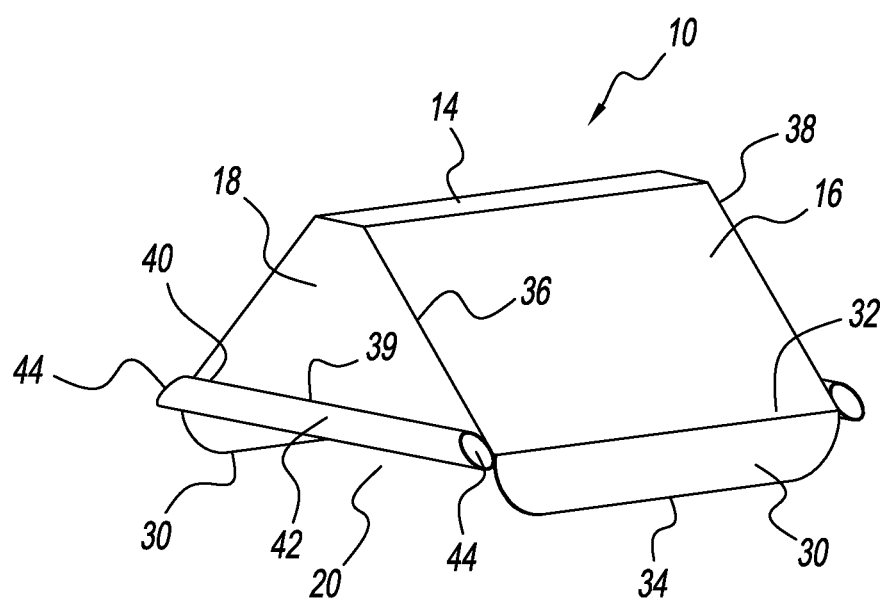
FIG. 1 is a perspective view of a hood.
Figure 2:
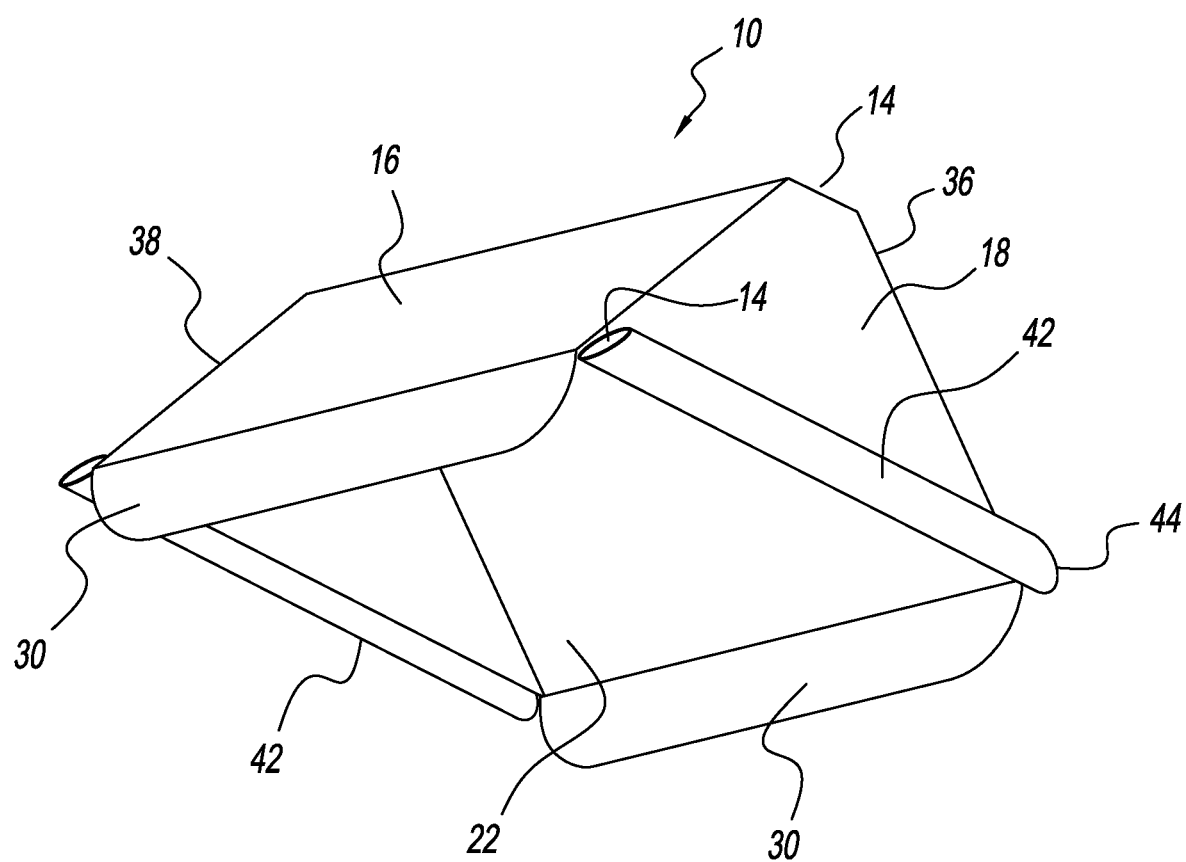
FIG. 2 is a bottom perspective view of a hood.
Figure 3:
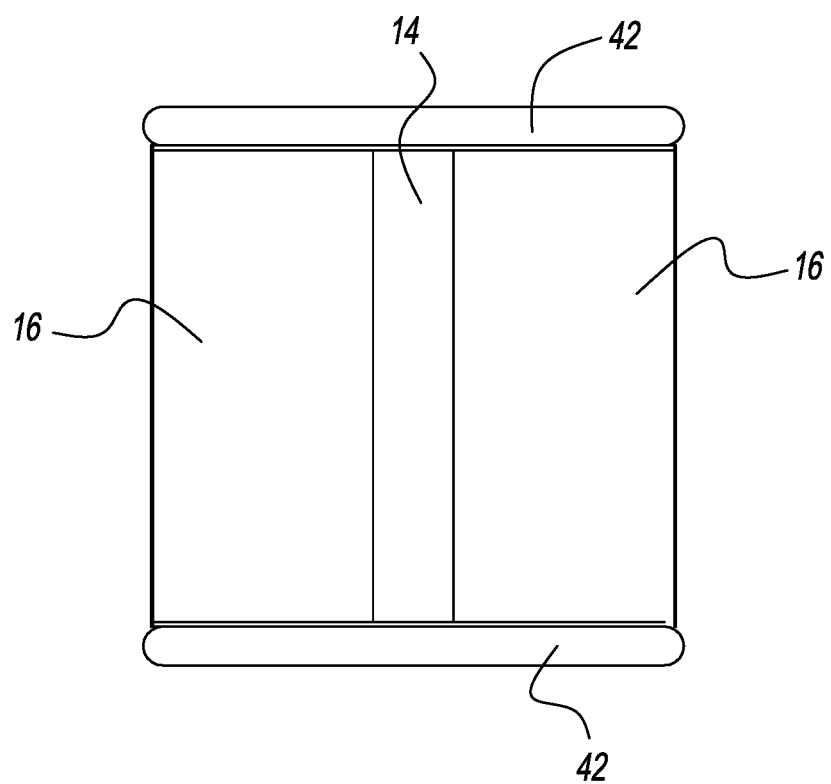
FIG. 3 is a top plan view of a hood.
Figure 4:
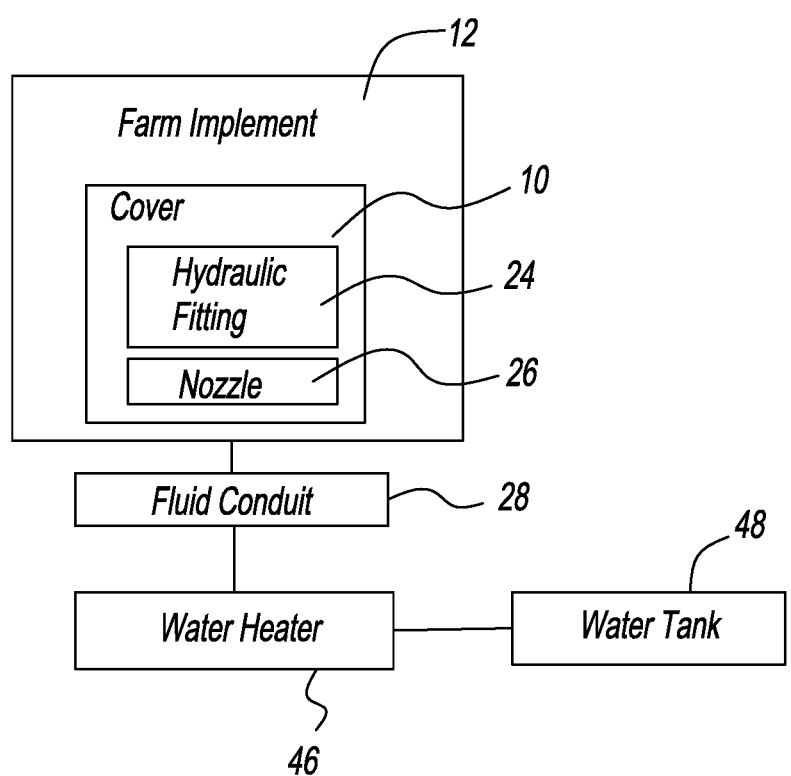
FIG. 4 is a schematic view of the environment of a system for protecting plants while spraying.

Referring to the Figures, a hot water steam cover or hood 10 is used in relation to a farm implement 12. The farm implement 12 is of any type such as a row crop planter, cultivator, or the like. In the example shown, the cover 10 is used in relation to a high clearance sprayer 12.

The cover 10 is of any size, shape, and structure. In the example shown, the cover 10 has a top wall 14, a pair of side walls 16, a pair of end walls 18, and an open bottom 20 that form a hollow chamber 22. The top wall 14 is generally horizontal, elongated, and preferably has a width of four inches and a length of approximately two feet and three inches. Extending through the top wall 14 into the hollow chamber 22 is a hydraulic fitting 24 having a spray nozzle 26 coupled to a fluid conduit or hose 28.

The side walls 16 extend downwardly and outwardly from the top wall 14 at an angle. Preferably, the side walls 16 terminate in a generally vertical flange 30 that extends from a bend line 32 to a lower edge 34. Connected to and extending downwardly from the top wall 14 and connected to a front edge 36 and a rear edge 38 of the side walls 16, are the end walls 18. Preferably the end walls 18 have a bottom edge 39 positioned in a plane above the vertical flanges 30. In the example shown, the end walls 18 have a trapezoidal shape. Attached to a bottom edge 40 of the end walls 18 is a hollow tube 42 having ends 44 cut at an angle to align with the profile of the side walls 16.

While the cover has been shown in a trapezoidal shape, any other shape such as square, rectangular, cylindrical, or the like, will still fall within the scope of the invention. As another example, instead of a top wall 14, the side walls 16 of the cover 10 can meet at a top edge to form an apex or a peak.

The cover 10 is adjustably mounted to the farm implement 12 such as a tool bar, sprayer boom, or depth wheel on a main frame. A fluid conduit 28 is connected to a heater 46, which is connected to a tank 48, mounted to an auxiliary device (i.e. wagon) and/or the implement 12. The fluid preferably is water. The water heater 46 is of any type and preferably is a 12 v Hotsy brand water heater having a diesel fuel burner connected to a diesel fuel tank. Preferred is that the water heater 46 be adapted to heat water to a temperature of between 200° F. to 275° F.

In operation, the cover 10 is mounted to the implement and adjusted so that the cover 10 is positioned between plant rows below the vegetation on a plant. As the implement travels through the field, heated water is sprayed toward weeds that dwell between rows and below the vegetation of the plants. The hot water causes the weeds to blister, dehydrate, and die. The cover protects the vegetation of the plants from hot water splatter and steam that potentially could damage the plant. As a result, a system has been disclosed that permits weed treatment in an organic and no-till manner.

From the above discussion and accompanying figures and claims it will be appreciated that the hot water steam cover 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A system for protecting plants while spraying, comprising:
   a hood has a top wall, a pair of side walls, a pair of end walls and an open bottom;
   wherein the side walls terminate in a generally vertical flange that extends from a bend line to a lower edge;
   wherein only the side walls have a generally vertical flange;

the hood mounted to a farm implement having a hollow chamber configured to be positioned between plant rows and below plant vegetation;

the hood having a hollow tube along a bottom edge;

a hydraulic fitting having a spray nozzle extending through the hood and into the hollow chamber; and a fluid conduit coupled to the hydraulic fitting and connected to a fluid heater that is connected to a fluid tank.

2. The system of claim 1 wherein the hood is adjustably mounted to the farm implement.

3. The system of claim 1 wherein the end walls extend downwardly and outwardly at an angle.

4. The system of claim 1 wherein the top wall was a length of approximately two feet and three inches, and a width of four inches.

5. The system of claim 1 wherein the hood has a trapezoidal shape.

6. The system of claim 1 wherein the ends of the hollow tube are cut at an angle.

7. The system of claim 1 wherein the hood has a pair of side walls that converge at a top edge to form a peak of the hood, a pair of end walls and an open bottom.

8. The system of claim 7 wherein the side walls extend downwardly and outwardly from the top wall at an angle.

9. The system of claim 1 wherein the fluid heater is a 12V fluid heater having a diesel fuel burner connected to a diesel fuel tank.

10. A system for protecting plants while spraying, comprising:

a hood having a pair of side walls, a pair of end walls, and an open bottom that form a hollow chamber, wherein the hollow chamber is configured to be positioned between plant rows and below plant vegetation;

the pair of side walls each terminating in a generally vertical flange that extends from a bend line to a lower edge, wherein only the side walls have a generally vertical flange;

the pair of end walls each having a bottom edge positioned in a plane above the vertical flanges;

the bottom edge of each of the pair of end walls having a hollow tube positioned along the bottom edge;

a hydraulic fitting having a nozzle extending through the hood and into the hollow chamber; and a fluid conduit coupled to the hydraulic fitting and connected to a fluid heater that is connected to a fluid tank.

11. A system for protecting plants while spraying, comprising:

a hood has a top wall, a pair of side walls, a pair of end walls and an open bottom;

wherein the side walls terminate in a generally vertical flange that extends from a bend line to a lower edge;

wherein the bottom edge is positioned along the end walls and in a plane above the vertical flanges;

the hood mounted to a farm implement having a hollow chamber configured to be positioned between plant rows and below plant vegetation;

the hood having a hollow tube along a bottom edge;

a hydraulic fitting having a spray nozzle extending through the hood and into the hollow chamber; and a fluid conduit coupled to the hydraulic fitting and connected to a fluid heater that is connected to a fluid tank.

* * * * *